United States Patent
Marchini (10) Patent No.: US 8,261,800 B2
(45) Date of Patent: Sep. 11, 2012

(54) PROCESS AND APPARATUS FOR MANUFACTURING A PNEUMATIC TYRE

(75) Inventor: Maurizio Marchini, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 372 days.

(21) Appl. No.: 12/308,881

(22) PCT Filed: Jun. 29, 2006

(86) PCT No.: PCT/IB2006/001801
§ 371 (c)(1),
(2), (4) Date: Dec. 29, 2008

(87) PCT Pub. No.: WO2008/001154
PCT Pub. Date: Jan. 3, 2008

(65) Prior Publication Data
US 2009/0277569 A1    Nov. 12, 2009

(51) Int. Cl.
*B29D 30/32* (2006.01)
(52) U.S. Cl. .......... 156/402; 156/132; 156/400
(58) Field of Classification Search .......... 156/132, 156/400, 402, 131, 135, 398, 403, 414, 421
See application file for complete search history.

(56) References Cited

U.S. PATENT DOCUMENTS

| | | | | |
|---|---|---|---|---|
| 998,657 | A | * | 7/1911 | Thomas ............... 38/102.2 |
| 2,409,974 | A | * | 10/1946 | Breth et al. ............ 156/132 |
| 3,032,093 | A | | 5/1962 | Nebout |
| 3,765,986 | A | | 10/1973 | Brey |
| 3,887,423 | A | | 6/1975 | Gazuit |
| 4,362,592 | A | | 12/1982 | Ruppel |
| 6,318,434 | B1 | | 11/2001 | Gutknecht et al. |

FOREIGN PATENT DOCUMENTS

| | | | |
|---|---|---|---|
| DE | 22 36 938 A1 | | 3/1973 |
| GB | 522424 | * | 6/1940 |

* cited by examiner

*Primary Examiner* — Richard Crispino
*Assistant Examiner* — Martin Rogers
(74) *Attorney, Agent, or Firm* — Finnegan, Henderson, Farabow, Garrett & Dunner, L.L.P.

(57) ABSTRACT

A process and apparatus for turning up the carcass plies in a tire, the tire including a carcass structure including at least one carcass ply provided with at least one reinforcing element coated with at least one layer of elastomeric material, and at least one annular reinforcing structure. The apparatus is equipped with a support drum conveniently shaped for supporting at least one ply and with at least one turning up device provided with an annular continuous presser element. The latter is axially translatable along an axis of the support drum and radially expandable or contractible relative to the axis of the support drum between a contracted position and an expanded position to turn up the carcass ply around an annular reinforcing structure. The device is further provided with means of adjusting the contracted position of the annular element depending on the size of the tire to be manufactured.

17 Claims, 8 Drawing Sheets

PROCESS AND APPARATUS FOR MANUFACTURING A PNEUMATIC TYRE

CROSS REFERENCE TO RELATED APPLICATION

This application is a national phase application based on PCT/IB2006/001801, filed Jun. 29, 2006, the content of which is incorporated herein by reference.

BACKGROUND OF THE INVENTION

1. Field of the Invention

The present invention relates to a process and an apparatus for building a pneumatic tyre.

2. Description of the Related Art

Generally, a tyre for vehicle wheels has a carcass structure essentially made up of one or more carcass plies substantially having a toroidal conformation. The axially opposite side edges of these plies are engaged to respective annular reinforcing structures provided with at least one bead core.

Each annular reinforcing structure is incorporated into a so-called "bead" defined along an inner circumferential edge of the tyre for anchoring the latter to a corresponding mounting rim.

Generally associated with the carcass structure is also a belt structure comprising one or more layers disposed in radial superposed relationship with respect to each other and to the carcass ply.

The belt layers generally consist of textile or metallic reinforcing cords with a crossed orientation and/or substantially parallel to the circumferential extension direction of the tyre. Applied to the belt structure at a radially external position is a tread band, made of elastomeric material like the other semifinished products constituting the tyre.

To the aims of the present description, by the term "elastomeric material" it is intended a composition comprising at least one elastomeric polymer and at least one reinforcing filler, and possibly additives of various types (cross-linking agents, plasticizers and other additives known in the art, for example).

Finally, a pair of sidewalls is provided on the axially opposite sides of the tyre, each sidewall coating a side portion of the tyre included between a so-called shoulder region, located close to the corresponding side edge of the tread band, and the corresponding bead.

In traditional manufacturing processes, formation of the carcass ply is carried out through manufacture of a rubberized fabric comprising a plurality of reinforcing thread elements, parallel to each other and incorporated into a layer of elastomeric material, generally referred to as "cords". Said rubberized fabric is for example made through a calendering operation sandwiching a plurality of said cords, disposed coplanar in side by side relationship, between two layers of elastomeric material.

The threads of said cords can consist of metal alloys such as steel, textile fibres, carbon fibres, glass fibres, Kevlar® or other fibres having a suitable strength for use in tyre construction.

Each carcass ply is then assembled to the other tyre components such as the above mentioned bead cores, on a so-called cylindrical building drum. The carcass ply is turned up around said bead cores in such a manner that when the whole carcass structure, initially made in the form of a cylindrical sleeve, is shaped into a toroidal configuration, the carcass ply and bead cores remain associated with each other, with the carcass ply turned up around said bead cores, being axially and radially extended from the inside to the outside.

Then in a subsequent operation, other tyre components such as the belt structure, sidewalls and tread band, are assembled on said carcass structure.

Referring again to the operation of turning up the carcass ply around the respective annular reinforcing structures, the particular critical character of this step must be herein emphasised. In fact, a bad turning up gives rise to structural problems in the tyre resulting from a partial slipping off of the carcass ply from the annular reinforcing structures, during manufacture of the tyre itself.

To meet the requirement of making carcass structures more linked to the annular reinforcing structures and to obviate the above mentioned drawbacks, some different solutions have been proposed.

For instance U.S. Pat. No. 6,318,434 discloses a tyre building drum with a turning-up device for a carcass ply of the traditional type in which the drum has two annular segments spaced apart from each other to support a bead core, and drum segments disposed inside each annular segment for the purpose of supporting some tyre components. The building drum has means for radially expanding that part of the type components supported by the inner drum segments.

In addition, the drum on both sides external to the annular segments has a first and a second set of axially extensible arms. Each arm has one end provided with a roller, and means for axially and radially moving each set of arms from a first position at which the rollers of one set form a virtually closed loop and a second radially expanded position at which, during the turning-up step, pressing of the expanded part of the tyre components that is located externally of the annular segments is carried out. Each roller of an arm of the second set is placed between two adjacent arms of the first set.

U.S. Pat. No. 3,887,423 discloses a tyre-manufacturing machine using a turning-up mechanism for carcass plies that is disposed sideways, at each end of a building drum. The mechanism comprises a plurality of arms pivotally mounted to one end and an annular expandable rubber air bag provided on said arms. The free end of each arm is equipped with a roller such disposed that it comes into engagement with the inside of the air bag. The arms rotate about their hinging point to turn the carcass ply up and are axially movable to close the carcass ply upon itself, when turned up.

U.S. Pat. No. 4,362,592 discloses a ply turning-up device for use with a building drum. The turning-up device comprises a plurality of arms disposed so as to form a circumference concentric to the axis of the building drum. The arms can be extended radially outwardly and have a radially movable free end to support a ring-shaped rotatable and expandable element. The latter is embodied by an annularly continuous helical spring. To radially expand the annular element, each arm has a cam follower co-operating with a cam disposed concentric to the drum axis.

The Applicant has first of all noticed that with a device like the one disclosed in U.S. Pat. No. 6,318,434 the tyre thus obtained may have faults due to a defective adhesion of the turned-up ply portions along the whole application circumference. This is essentially due to the impossibility of a circumferentially continuous and uniform pressure being obtained on the turned-up ply portion.

The Applicant has further noticed that with a device like that disclosed in U.S. Pat. No. 3,887,423, pressure is exerted in a circumferentially continuous manner, but not uniformly because this pressure varies between the air bag regions where the roller is present and those where said roller is absent.

The Applicant has also noticed that in a turning-up device of the above described type the air bag can be subject to quick wear so that frequent interventions for maintenance or replacement are required.

In addition, the Applicant has noticed that in a device like that disclosed in U.S. Pat. No. 4,362,592 the arm stroke for expansion of the annular element is absolutely determined by the inclination of the cam that is purposely designed depending on the size of the tyre to be manufactured. Therefore construction of a particular support drum is required, which drum must be provided with one turning-up device for each tyre size to be obtained.

Herein and in the following for tyre size it is intended the nominal fitting diameter of the rim, generally expressed in inches.

The Applicant has further noticed that according to the teachings of the known art the operation of bending the carcass plies is carried out with devices different from those causing turning-up around the annular reinforcing elements.

The Applicant has perceived that by exerting a circumferentially continuous and uniform pressure on the turned-up carcass ply portions, the drawbacks previously found on the tyre can be overcome, and has also observed that by varying the circumference sizes of the elements exerting pressure on the turned-up ply portions, tyres of different sizes can also be manufactured using the same apparatus.

SUMMARY OF THE INVENTION

The Applicant has found that with a tyre-building apparatus provided with an annularly continuous presser element capable of varying the radial-contraction position depending on the size of the tyre to be manufactured, the step of turning up the carcass plies of a tyre around the annular reinforcing elements can be obtained without involving lack of homogeneity and irregularities in the finished tyre.

The Applicant has further found that with a tyre-building apparatus in accordance with the present invention it is also possible to carry out the step of bending the carcass plies using the same device carrying out the turning-up step, which will bring about a reduction in costs.

It is to be pointed out that herein and in the following a ply is intended as "turned up" around an annular reinforcing structure or a bead core in the bead region, if at least one straight line parallel to the straight line tangent to the radially outermost point of the tyre section identified by the lying plane of the ply crosses the ply outline in the bead region at least at two distinct points.

As previously illustrated, by "bead region" it is intended the axially internal circumferential region of the tyre designed for anchoring of said tyre to a mounting rim, each bead region internally comprising said annular reinforcing structure.

In a first aspect the invention relates to an apparatus for building a pneumatic tyre, comprising:
  a support drum conveniently shaped for supporting at least one carcass ply;
  at least one device for laying said at least one carcass ply onto said support drum so as to form at least one projecting portion with respect to the drum;
  at least one device for applying at least one annular reinforcing structure close to an inner radial edge of said drum; and
  at least one turning-up device including: an annularly continuous presser element in coaxial relationship with the central axis X-X' of said drum and axially translatable along said axis X-X' and radially expandable relative to the axis of the support drum between a contracted position and an expanded position to turn up said projecting portion around one said annular reinforcing structure; and means for adjusting the contracted position of said annular element depending on the size of the tyre to be manufactured.

In a preferential aspect, the annularly continuous presser element is radially expandable and contractible relative to the central axis X-X' of the drum to contact the inner surfaces of the projecting portions and turn them up around at least one annular reinforcing structure.

Preferably, each contact element is telescopically circumferentially slidable relative to the adjoining contact element.

In another preferential aspect, the plurality of contact elements comprises a first set of male rollers including two axially opposite ends and a second set of female rollers including two axially opposite cavities, the male and female rollers being disposed in such a manner that each male roller is followed by a female roller, each end of a male roller being engaged in a cavity of a female roller thereby forming a closed loop.

Preferably, the apparatus comprises a plurality of support levers for the contact elements, which levers are disposed along a circumference that is concentric to the axis of the support drum, each lever being hinged on one centre of rotation.

In a further preferential aspect, all centres of rotation of the support levers are supported by a guide that is axially slidable relative to the axis of the support drum.

Advantageously, each lever comprises one end hinged on a second guide element axially translatable relative to the first guide element to determine a radial expansion or contraction of the presser element and adjust the radially contracted position of the presser element.

Taking into account the particular mechanical features of the apparatus and the infinite number of possibilities of movement of the contact elements, it appears that the apparatus in accordance with the present invention can also advantageously be used for carrying out bending of the carcass plies on the support drum, thus reducing the number of devices required for manufacture of the tyre.

In a further aspect, the invention relates to a process for building a pneumatic tyre, said tyre comprising: a carcass structure including at least one carcass ply; at least one annular reinforcing structure associated with the carcass structure at a radially internal edge of the carcass structure; a tread band at a radially external position to said carcass structure; and a pair of sidewalls located at axially opposite positions on the carcass structure; the process comprising the steps of:
a) laying a carcass ply onto a support drum, so as to substantially form a cylindrical sleeve around the cross-section outline of the support drum defining a central crown portion extending on the drum at a radially external position, and two side portions spaced apart from each other and axially projecting relative to the drum;
b) bringing an annularly continuous presser element into contact with a radially external surface of the carcass ply;
c) axially and radially translating the annularly continuous presser element to bend the side portions;
d) applying at least one annular reinforcing structure close to the side portions;
e) bringing the annularly continuous presser element into contact with an axially internal surface of the side portions thus bent;
f) axially and radially translating the annularly continuous presser element to fold the projecting portions around said at least one annular reinforcing structure.

Further features and advantages of the invention will become more apparent from the detailed description of same preferred but not exclusive embodiments of an apparatus for building a pneumatic tyre for vehicle wheels, in accordance with the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

Figure 1:
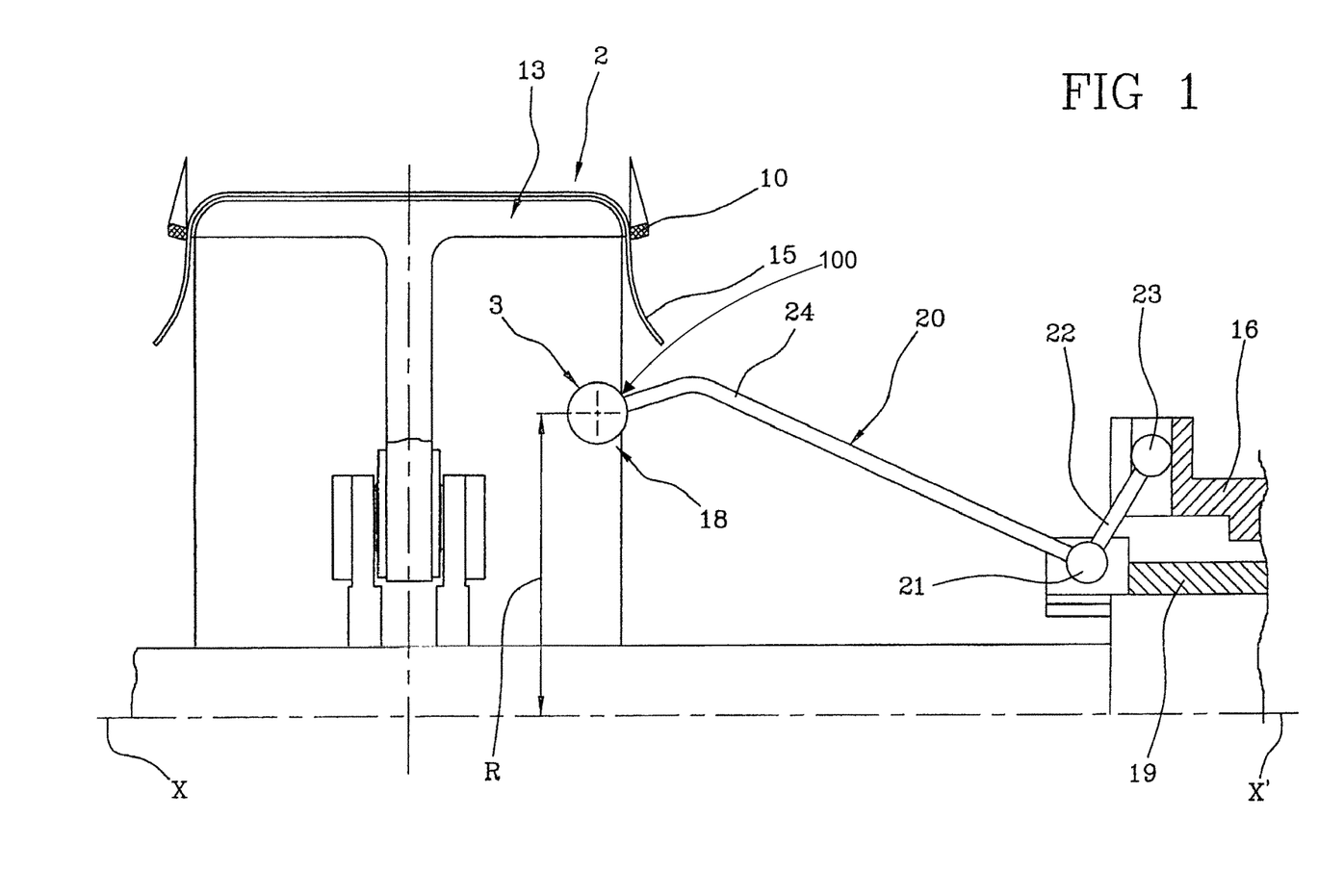
FIG. 1 is a diagrammatic view of an apparatus for building a tyre in accordance with the invention, with a turning-up device in a contracted position.
Figure 2:
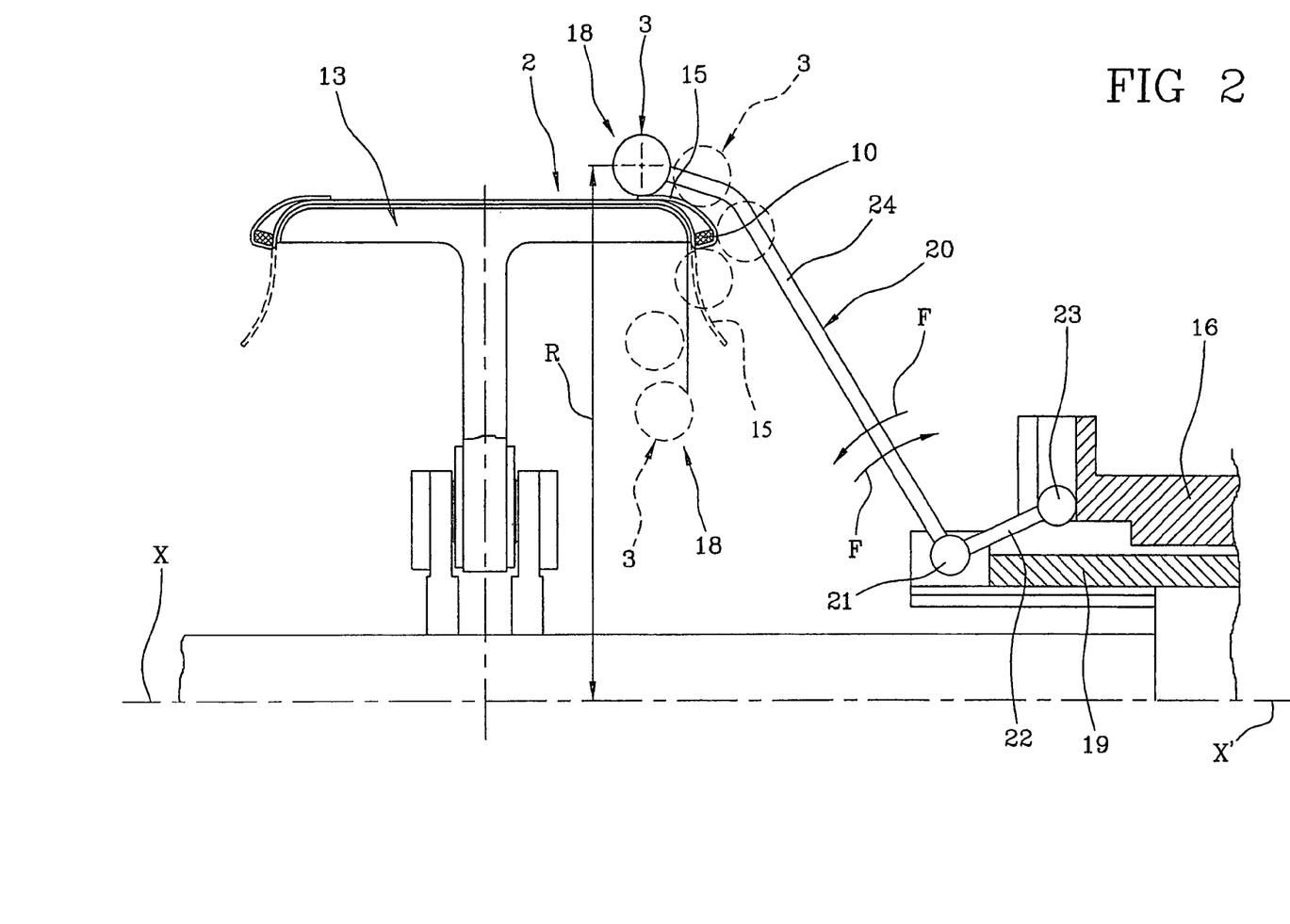
FIG. 2 is a diagrammatic view of an apparatus for building a tyre in accordance with the invention, with a turning-up device in an expanded position.

With reference to FIGS. 1 and 2, an apparatus for turning up the carcass plies of a tyre in accordance with the present invention is identified with reference numeral 1.

The pneumatic tyre manufactured with the method and apparatus according to the present invention is of the type essentially provided with a carcass structure consisting of at least one carcass ply 2 comprising at least one reinforcing element coated with at least one layer of elastomeric material, and two annular reinforcing structures 10.

Apparatus 1 has a support drum 13 on which the carcass ply 2 is laid; at least one device for laying at least one carcass ply 2 on the support drum 13, so as to form at least one projecting portion 15 with respect to the drum 13; at least one device for applying at least one annular reinforcing structure 10 close to a radially internal edge of the drum 13; and at least one turning-up device 100 carrying out turning up of the ends of said carcass ply 2 around a reinforcing structure 10.

The apparatus 1 in accordance with the present invention generally has two turning-up devices 100 disposed sideways of the support drum 13; however, since the turning-up devices 100 are perfectly identical and arranged in a mirror image relationship with respect to the support drum 13, only one of them will be described and illustrated in the present specification.

Each turning-up device 100 has at least one annularly continuous presser element 3, axially translatable along the axis of the support drum 13 and radially expandable or contractible relative to the axis X-X' of said support drum 13.

It is to be noted that in FIGS. 1 and 2 only the upper half of the support drum 13 is shown, the lower one that is perfectly symmetrical with respect to axis X-X' has been omitted for convenience.

The annularly continuous presser element 3 comprises a plurality of contact elements 18 disposed along a circumference that is concentric to the axis of the support drum 13 and a plurality of centres of rotation 21 each operationally associated with a contact element 18 to enable each contact element 18 to rotate relative to the respective centre of rotation 21.

In other words, to radially expand or contract the presser element 3, each contact element 18 rotates in a continuous manner, i.e. taking all possible angular positions, around its centre of rotation 21, as shown by arrows F in FIG. 1.

The possibility of the contact elements 18 taking any angular position starting from an angular position that is selected depending on the tyre manufacturing requirements enables the apparatus itself to manage several different tyre sizes substantially simultaneously on the same production line. In other words, the contact elements 18 can be located to any contracted position of the annular element 3 depending on the sizes of the tyre to be manufactured.

As above said, the contact elements 18 are disposed around a circumference that is concentric to the axis X-X' of the support drum 13, in this way defining a radius R for the annularly continuous presser element 3, relative to said support drum. On the radial expansion of the annular element 3 there is a corresponding increase of radius R and on the radial contraction of element 3 a corresponding reduction of radius R occurs.

In detail, for carrying out the turning up step of the carcass ply 2, for instance, the annularly continuous presser element 3 rotates between a radially contracted position determined by suitable adjusting means and a radially expanded position at which the contact elements 18 are disposed close to the side 34 of the support drum 13.

Each contact element 18 is always in contact with the adjoining contact elements 18 so as to define a continuous circumferential surface, irrespective of the radially expanded or contracted positions of the presser element 3 itself.

The contact elements 18 are either directly or indirectly supported, as better specified in the following, by a plurality of, support levers 20 disposed along a circumference that is concentric to the axis of the support drum 13. Each lever 20 comprises a main body 24 hinged on a guide 19 at the centres of rotation 21 to enable free rotation of the contact elements 18 in the direction denoted by arrows F.

In particular, to enable the levers 20 to rotate about the centres of rotation 21, each lever 20 has an end portion 22 inclined to the main body 24 and supported at 23, on a second guide element 16. According to an advantageous aspect of the present invention, the end portion 22 is inclined to the main body 24 through about 90°.

The second guide element 16 is able to axially translate relative to the first guide element 19 and for the purpose it is mounted in coaxial relationship with the first guide element 19.

Axial translation of the second guide element 16 relative to the first guide element 19 causes the rotation of levers 20 about the centres of rotation 21 and consequently, depending on the rotation direction, radial expansion or contraction of the presser element 3.

Axial translation of the second guide element 16 relative to the first guide element 19 determines and allows adjustment of the radially contracted position of the presser element 3. Therefore, the two guide elements 16, 19 together with the particular conformation of the levers 20 act as means for adjusting the contracted position of the annular element 3.

Each support lever 20 has a second end 25 supporting the contact element 18, that is disposed inclined to the main body 24 to enable the contact element 18 to get into contact with the surfaces of the carcass ply 2.

To enable axial translation of the contact elements 18 of the annularly continuous presser element 3, the guide element 19 is axially slidable relative to axis X-X' of the support drum 13.

The translation movement of the contact elements 18 relative to axis X-X' combined with the rotation of said elements 18 around the centres of rotation 21 allows each contact element 18 to perfectly follow the complex outline of the support drum 13 during the step of turning up and bending the carcass ply.

The contact elements 18 are embodied by a first set of male rollers 5 and a second set of female rollers 6 telescopically mounted with respect to each other.

Figure 3:
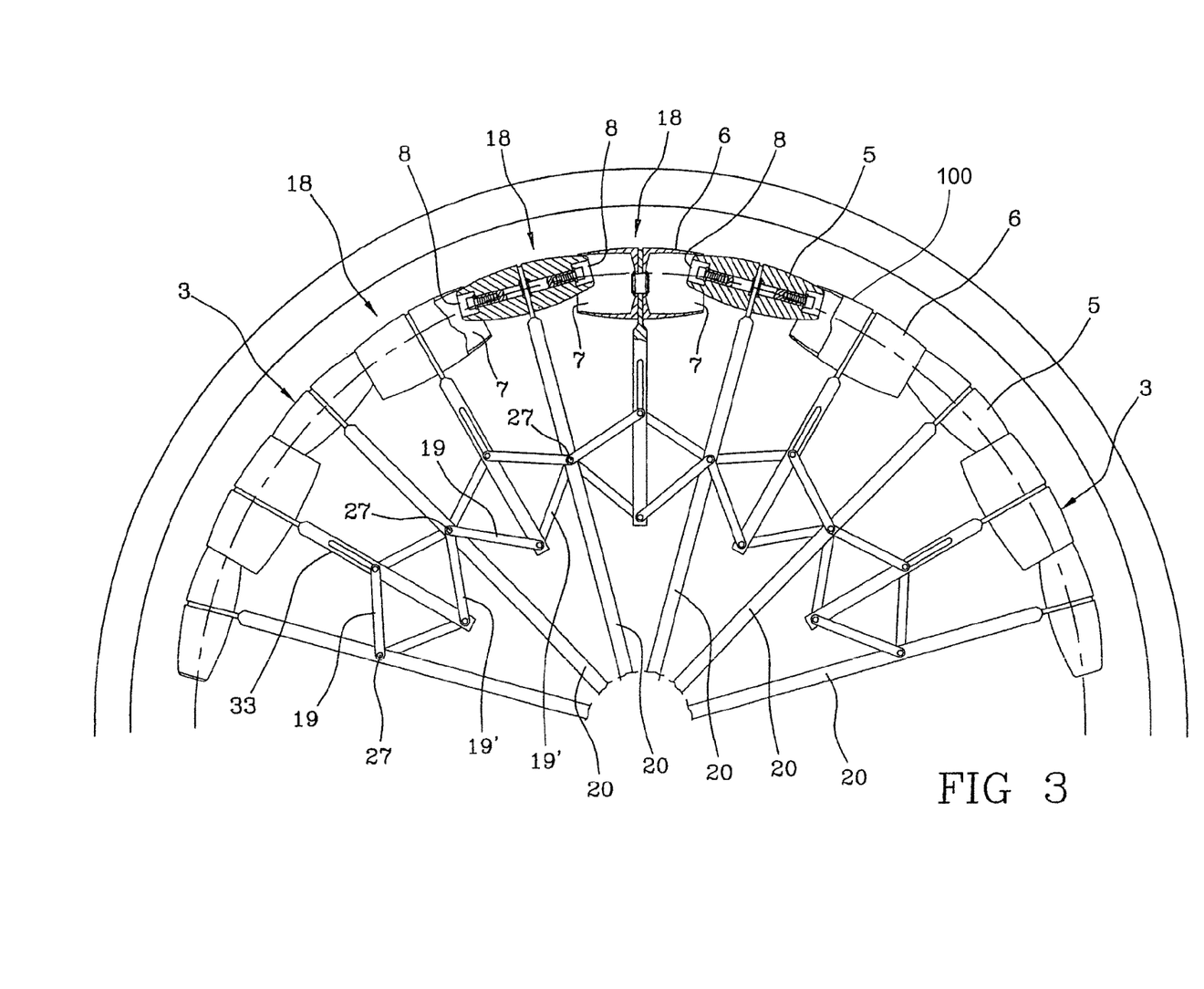
FIG. 3 is a diagrammatic side view of the annular element of a turning-up device in accordance with the present invention, in a contracted configuration.
Figure 4:
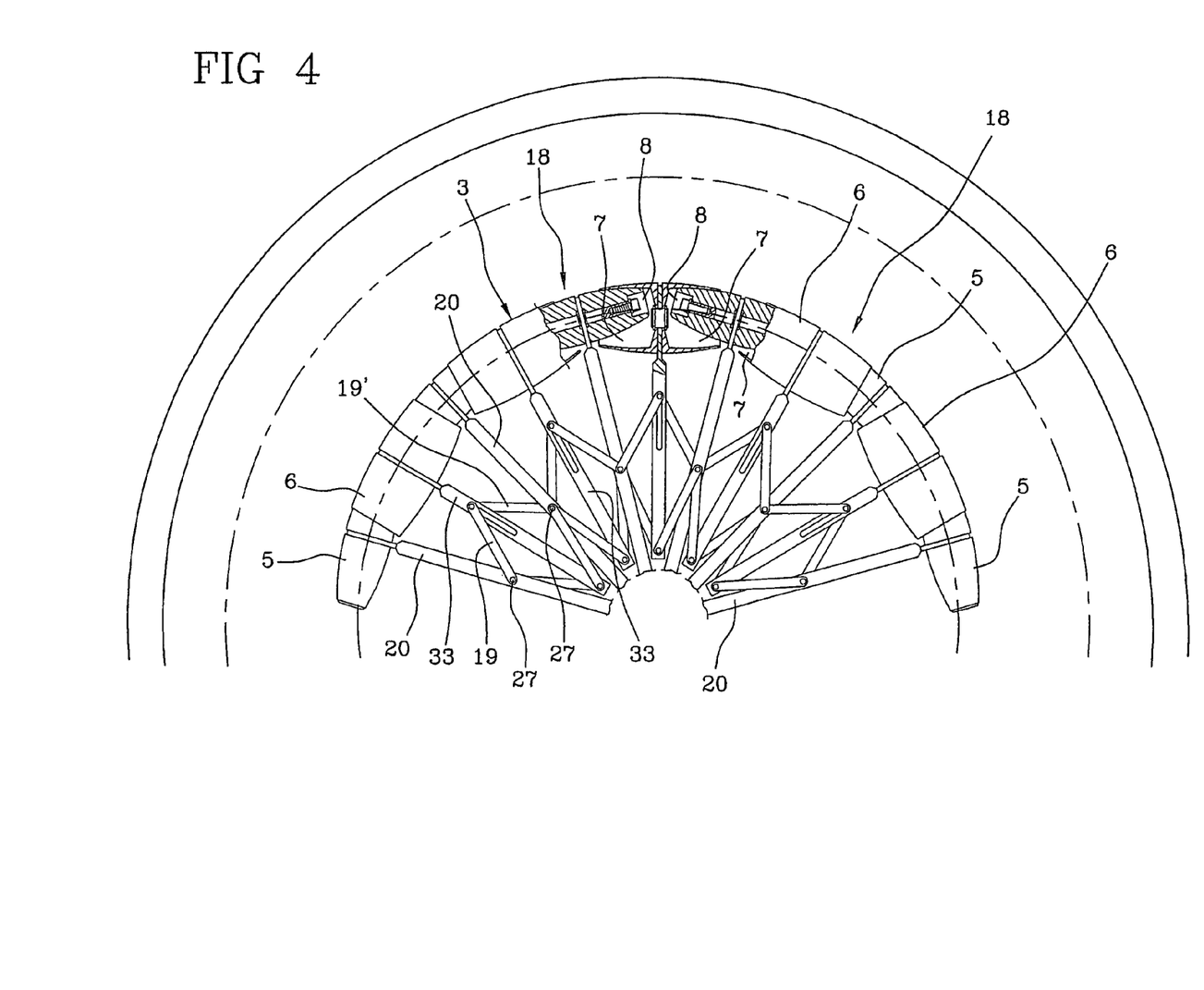
FIG. 4 is a diagrammatic side view of the annular element of the turning-up device according to the present invention in an expanded configuration.

In detail, as shown in FIGS. 3 and 4, each male roller 5 is substantially shaped as a cylinder provided with two axially opposite head ends 8 while each female roller 6 substantially appears like a cylinder which is provided with two axially opposite cavities 7 in register with the head ends of the male rollers 5.

The male 5 and female 6 rollers are therefore disposed, as shown in FIGS. 2 and 3, in such a manner that each male roller 5 is followed by a female roller 6 and that each end 8 of a male roller 5 is engaged in a cavity 7 of a female roller 6 so as to form a closed loop.

According to a first embodiment, not shown in the figures, the male rollers 5 and female rollers 6 are directly supported by the support levers 20. In detail, each male roller 5 and each female roller 6 is rotatably mounted on a respective support lever 20 so that it can rotate about its symmetry axis.

According to a second embodiment, each male roller 5 is directly supported by a support lever 20, while the female rollers 6 are indirectly supported by the support levers 20 through the male rollers 5.

In detail, while each male roller 5 is rotatably mounted on a respective support lever 20 so that it can rotate about its symmetry axis, the female rollers 6 are supported by the adjacent male rollers 5 due to the engagement between the end 8 and cavity 7, and are driven in rotation by said male rollers 5 around their symmetry axis.

To keep the position of each female roller 6 centred relative to that of the two adjacent male rollers 5 and therefore prevent the female roller 6 from falling during radial expansion of the presser element 3, centering elements 9 are present.

In particular, each centering element 9 comprises a semilever 33 in engagement with a female roller 6 so as to ensure free rotation of the female roller 6, and two pairs of arms 19, 19'.

Each pair of arms 19, 19' is hinged at a single common point 27 on a support lever 20 and at two distinct points 28 on a semilever 33 so as to form a four-bar linkage when the presser element 3 is expanded.

Figure 5:
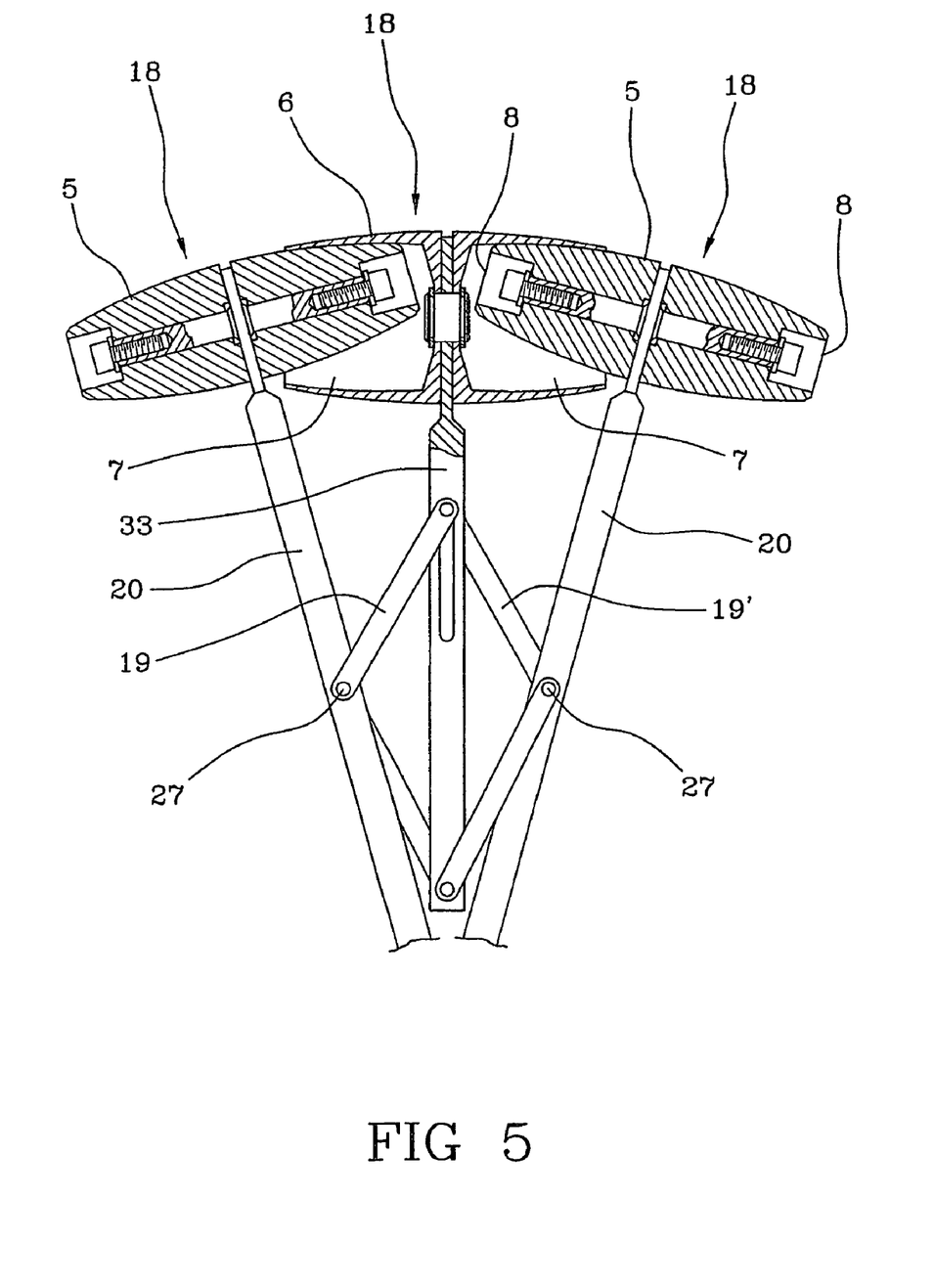
FIG. 5 is a diagrammatic view of a detail of a turning-up device in accordance with the present invention.

As viewed in more detail from FIG. 5, both the male rollers 5 and female rollers 6 have an outward-swelling outline so as to ensure the greatest contact continuity between the rollers 5, 6 and sides 34 of the support drum 13 during the turning-up step.

Figure 6:
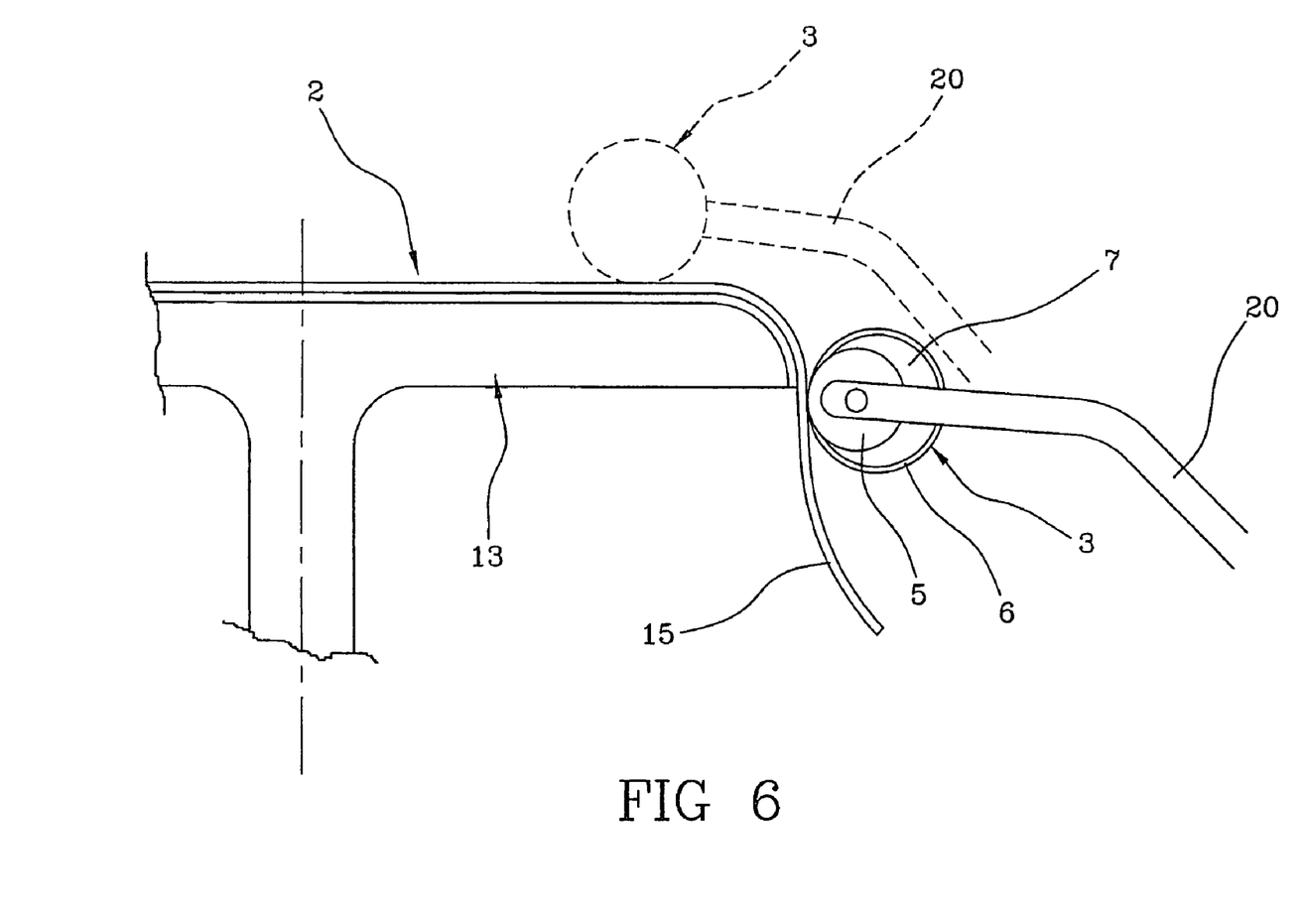
FIG. 6 is a diagrammatic view of the step of bending the ply of a carcass structure of a tyre by means of the apparatus in accordance with the present invention.
Figure 7:
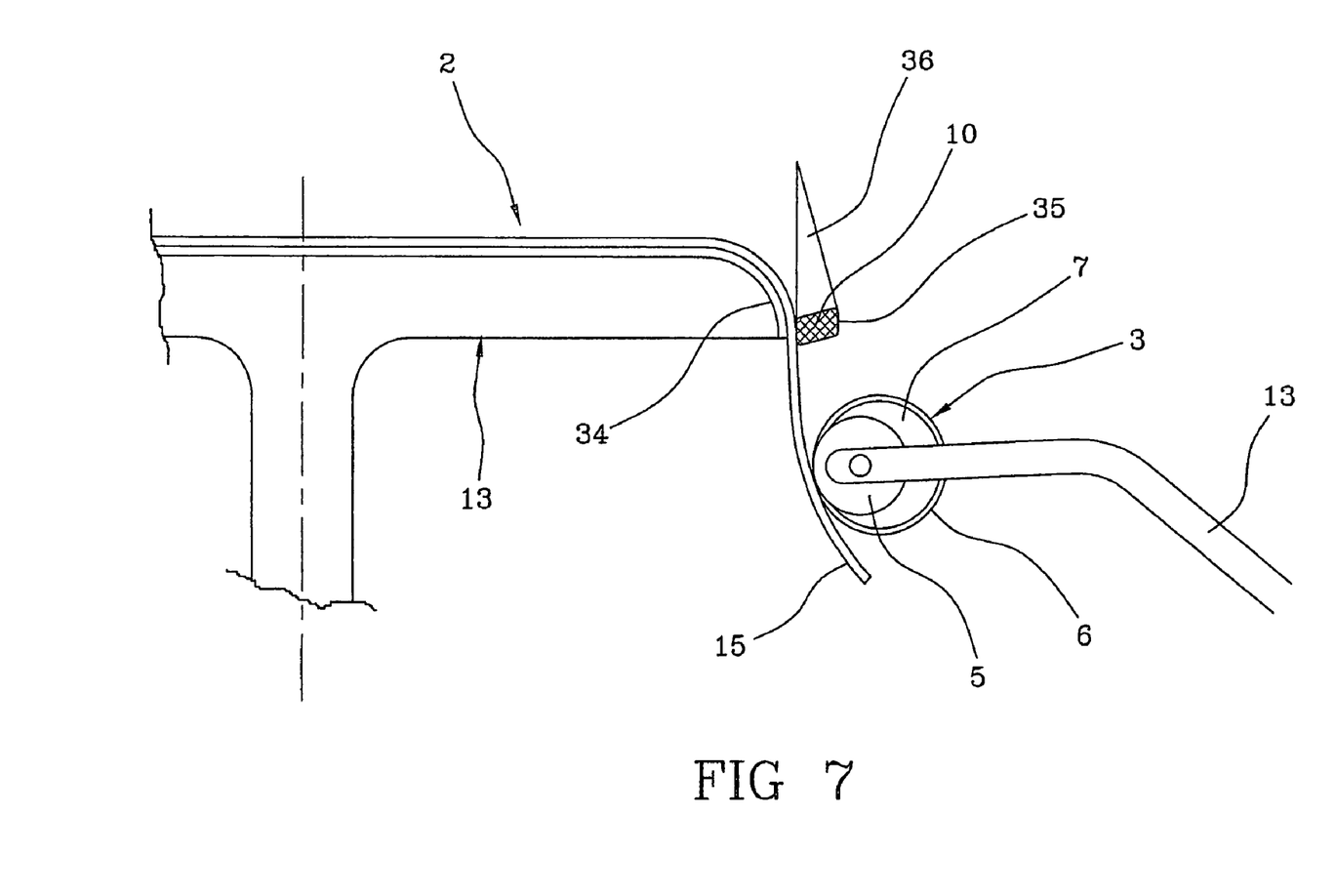
FIG. 7 is a diagrammatic view of the step of positioning an annular reinforcing structure.
Figure 8:
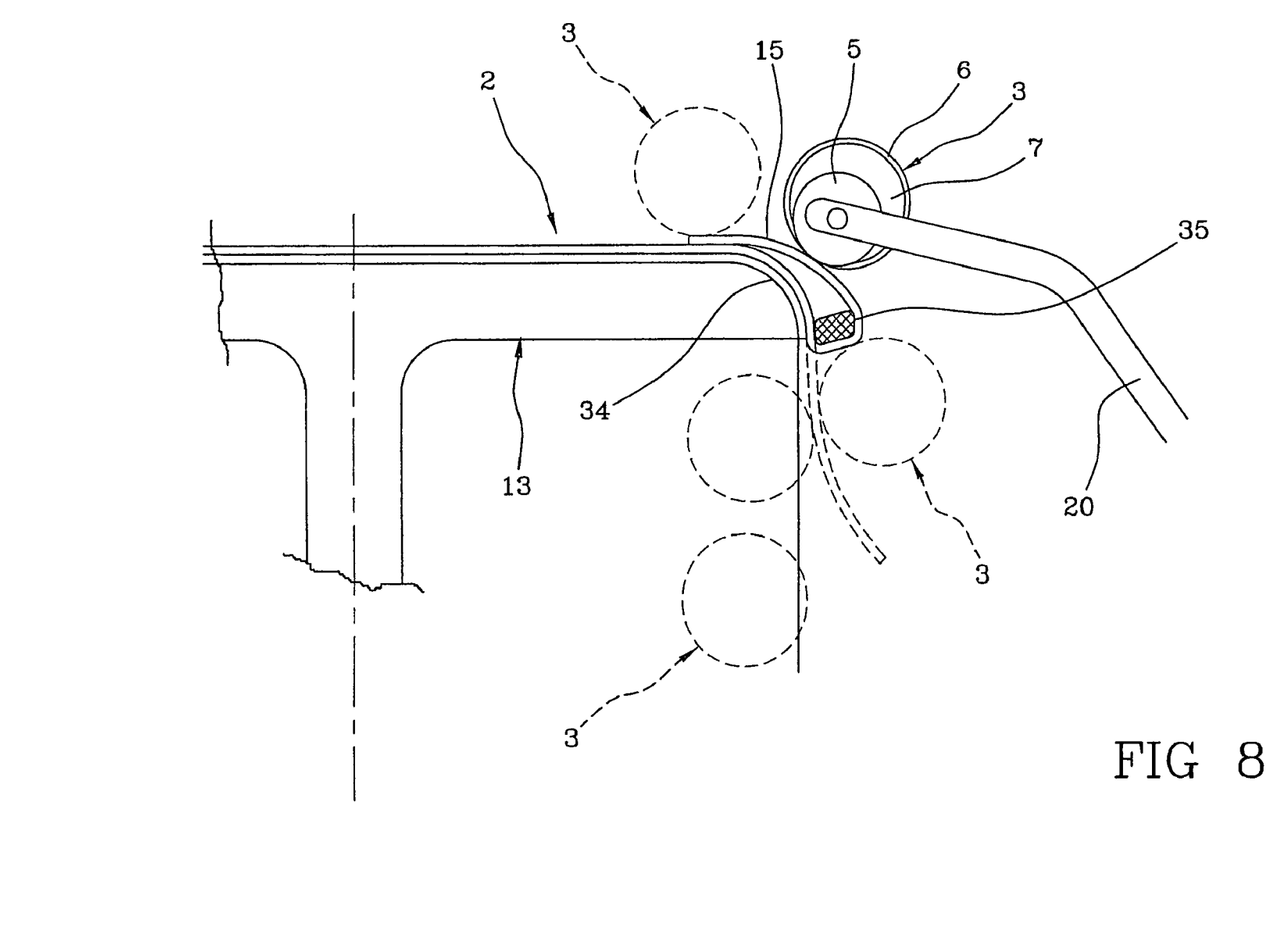
FIG. 8 is a diagrammatic view of the step of turning up the ply of a carcass structure of a tyre by means of the apparatus in accordance with the present invention.

Shown in FIGS. 6-8 are some steps of the tyre building method in accordance with the present invention. This tyre comprises a carcass structure including at least one carcass ply 2, and at least one annular reinforcing structure 10 associated with the carcass ply. The carcass structure 10 has at least one annular reinforcing element 35 and at least one filling element 36.

In known manner, the tyre further comprises a tread band at a position radially external to the carcass structure, and a pair of sidewalls at axially opposite positions on the carcass structure. Manufacture of said carcass structure contemplates initial laying of a carcass ply on a support drum 13. In particular, the carcass ply 2 is such laid as to substantially form a cylindrical sleeve around the cross-section outline of the support drum 13 to define a central crown portion 37 extending on the drum 13 at a radially external position and two side portions 15 spaced apart from each other and axially projecting relative to drum 13.

At this point the projecting side portions 15 of the carcass ply 2 are bent, i.e. radially folded on the inside of drum 13.

Thus, the size of the circumference formed by the contact elements 18 of the presser element 3 is adjusted by suitable adjusting means, depending on the size of the support drum 13.

The annularly continuous presser element 3 so adjusted is then brought into contact with the radially external surfaces of the carcass ply 2. Next, the annularly continuous presser element 3 in contact with the radially external surface of the carcass ply 2 is radially translated still from the outside to the inside of the support drum 13 and axially from the inside of the support drum 13 to the outside so as to bend the side portions 15 down, moving from the position shown in chain line in FIG. 6 to the position shown in solid line still in FIG. 6.

In addition, it is to be pointed out that during the bending step the ends of the side portions 15 stay in any case substantially parallel to the central axis X-X', see FIG. 6.

FIG. 7 shows a subsequent step of the process for building the pneumatic tyre, in which associated with the carcass ply 2 is at least one annular reinforcing structure 10 at the side portions 15 of the carcass ply 2 itself in such a manner that the annular reinforcing element 35 of the annular reinforcing structure abuts against the carcass ply 2 at the sides 34 of the support drum 13.

Preferably, during this step, the annularly continuous presser element 3 stays in contact with the outer surface of the side portions 15 to prevent the carcass ply 2 from springing back.

Shown in FIG. 8 is the step of turning up the carcass ply 8; to this aim, adjustment of the annularly continuous presser element 3 and in particular of the circumference formed by the contact elements 18 occurs, depending on the size of the tyre to be manufactured on the support drum 13, through suitable adjusting means.

The annularly continuous presser element 3 thus adjusted is then brought into contact with the axially internal surfaces of the side portions 15 bent in this way. The annularly continuous presser element 3, in contact with the axially internal surface of the side portions 15 is first axially translated from the inside to the outside of the support drum 13 and radially from the inside of the support drum 13 to the outside and afterwards axially from the outside to the inside of the support drum 13 and radially from the inside of the support drum 13 to the outside, so as to carry out turning up of the side portions 15 around the annular reinforcing structure 10, moving through the positions shown in chain line in FIG. 8.

It is also to be pointed out that both during the step of bending the ply 2 and during the turning-up step, in order to avoid tears on the carcass ply 2, the presser element 3 slides on the surfaces of the side portions 15 at least partly. In other words, the rollers 5 and 6 can revolve on themselves to convert the possible sliding friction into rolling friction.

The invention claimed is:

1. An apparatus for building a pneumatic tyre, comprising:
a support drum conveniently shaped for supporting at least one carcass ply;
at least one device for laying said at least one carcass ply on said support drum so as to form at least one projecting portion with respect to the support drum;
at least one device for applying at least one annular reinforcing structure close to an inner radial edge of said support drum;
at least one turning-up device comprising an annular continuous presser element in coaxial relationship with a central axis of said support drum and axially translatable along said axis and radially expandable relative to the axis of the support drum between a contracted position and an expanded position to turn up said projecting portion around one said annular reinforcing structure; and
means for adjusting the contracted position of said annular continuous presser element depending on the size of the tyre to be manufactured,
wherein said annular continuous presser element comprises a plurality of contact elements disposed along a circumference concentric to the central axis of said support drum, and
wherein said plurality of contact elements comprises a first set of male rollers comprising two axially opposite ends, and a second set of female rollers comprising two axially opposite cavities, said male and female rollers being disposed in such a manner that each male roller is followed by a female roller, each end of a male roller being engaged in a cavity of a female roller thereby forming a closed loop.

2. The apparatus as claimed in claim 1, wherein said annular continuous pressure element is radially expandable and contractible relative to the central axis of said drum to contact the inner surfaces of said projecting portions and turn them up around said at least one annular reinforcing structure.

3. The apparatus as claimed in claim 1, wherein said annular continuous presser element is radially expandable and contractible relative to the central axis of said drum to contact the radially external surface of said carcass ply and bend said projecting portions radially folding them at least partly toward the central axis of said drum.

4. The apparatus as claimed in claim 1, wherein a plurality of centers of rotation, each operationally associated with one contact element to enable each contact element to rotate relative to a respective center of rotation in a continuous manner, radially expand or contract said presser element between a radially contracted position and a radially expanded position;
each contact element being in contact and defining a continuous circumferential surface with adjoining contact elements irrespective of the radially expanded or contracted position of said presser element.

5. The apparatus as claimed in claim 4, wherein each contact element is telescopically circumferentially slidable relative to the adjoining contact element.

6. The apparatus as claimed in claim 4, wherein a plurality of support levers for said contact elements is provided, which levers are disposed along a circumference that is concentric to the axis of the support drum, each lever being hinged on one said center of rotation.

7. The apparatus as claimed in claim 6, wherein each male roller is supported by one said support lever.

8. The apparatus as claimed in claim 6, wherein each male roller is rotatably mounted on the respective support lever in such a manner that said roller can rotate around the symmetry axis thereof.

9. The apparatus as claimed in claim 6, wherein each female roller is supported by one said support lever.

10. The apparatus as claimed in claim 9, wherein each female roller is rotatably mounted on a support lever in such a manner that said roller can rotate about a symmetry axis thereof.

11. The apparatus as claimed in claim 6, wherein each female roller is supported by two adjoining male rollers and is driven in rotation by said male rollers.

12. The apparatus as claimed in claim 11, wherein each female roller is maintained to a relative position with respect to the two adjoining male rollers by a centering element irrespective of the radially expanded or contracted position of the presser element.

13. The apparatus as claimed in claim 12, wherein each centering element is supported and held to a correct position by at least two pairs of arms hinged on two adjacent support levers, respectively.

14. The apparatus as claimed in claim 1, wherein each contact element comprises an outward-swelling outer outline to ensure contact continuity between the male and female rollers and sides of the support drum during a turning-up step.

15. The apparatus as claimed in claim 14, wherein all centers of rotation of said support levers are supported by a first guide that is axially slidable relative to the axis of the support drum.

16. The apparatus as claimed in claim 15, wherein each lever comprises one end hinged on a second guide element axially translatable relative to said first guide element to determine a radial expansion or contraction of said presser element and to adjust a position of minimum radial contraction of said presser element.

17. The apparatus as claimed in claim 6, wherein each support lever comprises a body and an end supporting the contact element, said end being disposed inclined to said main body to allow the contact element to contact the radially internal surface of the projecting portions when said presser element is in a position of minimum radial contraction.

* * * * *